(12) United States Patent  
Feng et al.

(10) Patent No.: US 7,522,831 B2  
(45) Date of Patent: Apr. 21, 2009

(54) CHARGING DEVICE FOR CAMERA FLASH

(75) Inventors: Wang Chang Feng, Hang-zhou (CN);  
Wei-Jia Du, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 631 days.

(21) Appl. No.: 11/168,495

(22) Filed: Jun. 29, 2005

(65) Prior Publication Data

US 2006/0159441 A1      Jul. 20, 2006

(30) Foreign Application Priority Data

Jan. 14, 2005    (TW) ............................. 94101089 A

(51) Int. Cl.  
*G03B 7/26* (2006.01)  
*H05B 41/14* (2006.01)

(52) U.S. Cl. .................. 396/205; 396/206; 315/241 P; 315/241 S

(58) Field of Classification Search ................ 396/205, 396/206; 315/200 A, 241 P, 241 S  
See application file for complete search history.

(56) References Cited

U.S. PATENT DOCUMENTS

| 4,571,551 | A * | 2/1986 | Trager ......................... 330/10 |
| 5,250,978 | A | 10/1993 | Ogawa |
| 5,966,552 | A | 10/1999 | Hata |
| 6,219,493 | B1 * | 4/2001 | Aoki et al. ................... 396/206 |
| 6,674,247 | B1 * | 1/2004 | Mead et al. .............. 315/241 P |
| 6,714,735 | B1 | 3/2004 | Lin et al. |
| 2003/0128555 | A1 * | 7/2003 | Schemmann et al. .......... 363/16 |

* cited by examiner

*Primary Examiner*—Melissa J Koval

(57) ABSTRACT

A charging device (1) for a camera flash includes a digital signal processor (10) providing a pulse width modulation signal and receiving a feedback signal, a voltage boosting circuit (20) electrically connected with the digital signal processor for outputting an induced current under the control of the pulse width modulation signal, a flash capacitor (40), and a charging circuit (30) electrically connected with the voltage boosting circuit and the flash capacitor for charging the flash capacitor by the induced current. The charging circuit includes a protection circuit (310) for protecting the flash capacitor and a feedback circuit (320) for outputting the feedback signal to the digital signal processor.

16 Claims, 3 Drawing Sheets

CHARGING DEVICE FOR CAMERA FLASH

BACKGROUND OF THE INVENTION

1. Field of the Invention

The present invention relates generally to a flash of a photographic device, and more particularly to a charging device for the flash.

2. Description of the Prior Art

A flash is a component disposed in a photographic device, such as a digital camera, a digital video camera, and the like, to produce extremely brightlight in a very short duration in indoor or other low light conditions. The earliest such camera flashes are consisted of a wad of magnesium powder that is ignited by hand. Later, magnesium filaments are contained in flash bulbs and electrically ignited by the camera shutter. Such flash bulbs could only be used once, and are too hot to handle immediately after use. Today's camera flash is comprised of a sealed tube which is filled with a mixture of gases, primarily Xenon, and electrodes to carry electrical current to the gas mixture. Additionally, a high voltage power source is necessary to energize the gas mixture. This high voltage is usually stored on a capacitor so as to allow very speedy delivery of very high current when the camera flash is triggered. Once the camera flash flashes, it consumes power. Therefore, to keep the camera flash working, there is a need of a charging device (or a charging circuit) for providing the camera flash with electricity.

The charging device often has a flash capacitor. Currently, there are two common methods for charging the flash capacitor. One method is to adopt self-oscillation. A conventional charging circuit working in the self-oscillation mode is disclosed in U.S. Pat. No. 5,966,552. This conventional charging circuit comprises a booster section for boosting a voltage up to a set voltage for the flash capacitor to use, and a charging-discharging section for charging the flash capacitor. However, the charging circuit comprises a number of capacitors, resistors, transistors and diodes to form a switch circuit, a self-oscillation circuit, a filtering circuit, a voltage transforming circuit, a rectifying circuit, a discharging circuit, and so on. Obviously, the circuit integration is very complicated. Especially, the self-oscillation circuit and the filtering circuit occupy too much space of the circuit board, which goes against the simplification and miniaturization trend of the circuit board. Furthermore, the charging efficiency of this conventional charging circuit is not high enough to meet the high efficiency requirements of today's electronic photographic devices.

The other method for charging a flash capacitor is to use a specialized integrate circuit (IC) chip. Such a method and the associated charging device are disclosed in U.S. Pat. No. 6,714,735. The charging device as disclosed comprises a flash capacitor, a voltage transforming circuit electrically connected with the flash capacitor for providing an induced current to charge the flash capacitor, a pulse width modulation (PWM) control circuit electrically connected with the voltage transforming circuit for providing a pulse voltage to the voltage transforming circuit that is driven to provide the induced current. However, the PWM control circuit is integrated onto a specialized IC chip that is specially used to provide PWM voltage signals. The PWM control circuit is electrically connected with a digital signal processor (DSP) in a photographic device. As is known, an IC chip is much more expensive than other basic components in a circuit. Therefore, using the IC chip inevitably increases the cost of the charging device. Furthermore, the PWM control circuit is under control of an additional charging control circuit. The charging control circuit not only occupies a certain space of the circuit board but also increases the cost of the charging device, thus increasing the volume and the total cost of the photographic device.

Hence, an improved charging device for a camera flash is required to overcome the above-mentioned disadvantages of the prior art.

BRIEF SUMMARY OF THE INVENTION

An object, therefore, of the present invention is to provide a simple charging device for a camera flash which utilizes a digital signal processor of the camera to directly control charging for the camera flash and monitor the charging process.

Another object of the present invention is to provide a charging device for a camera flash which utilizes a micro processing unit of the camera to directly control charging for the camera flash and monitor the charging process.

In order to achieve the above objects and overcome the above-identified deficiencies in the prior art, the charging device for a camera flash in accordance with the present invention comprises a digital signal processor providing a pulse width modulation signal and receiving a feedback signal, a voltage boosting circuit electrically connected with the digital signal processor for outputting an induced current under the control of the pulse width modulation signal, a flash capacitor, and a charging circuit electrically connected with the voltage boosting circuit and the flash capacitor for charging the flash capacitor by means of the induced current. The charging circuit comprises a protection circuit for protecting the flash capacitor and a feedback circuit for outputting the feedback signal to the digital signal processor. Once the feedback signal reaches a predetermined critical voltage, the digital signal processor stops to output the pulse width modulation signal. The critical voltage is predetermined in accordance with a maximum voltage value of the flash capacitor.

According to another aspect of the present invention, the charging device for a camera flash comprises a flash capacitor, a pulse control unit for outputting a pulse width modulation signal, an analog-to-digital converter for receiving a feedback signal and then converting the feedback signal into a digital signal, a micro processing unit electrically connected with the pulse control unit and the analog-to-digital converter for controlling the pulse control the output of the pulse width modulation signal by means of the feedback signal, a voltage boosting circuit electrically connected with the pulse control unit for outputting an induced current under control of the pulse control unit, and a charging circuit electrically connected with the voltage boosting circuit for receiving the induced current and also electrically connected with the flash capacitor.

Other objects, advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which.

DETAILED DESCRIPTION OF THE INVENTION

Reference will now be made in detail to preferred embodiments of the present invention.

Figure 1:
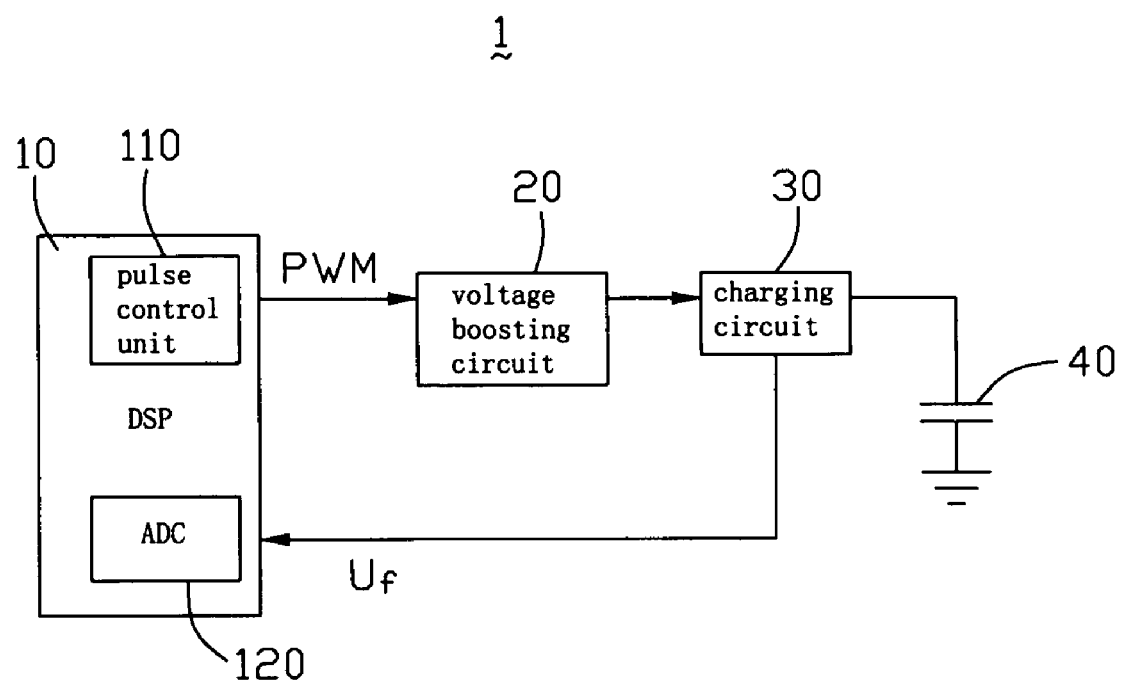
FIG. 1 is a block diagram of a charging device for a camera flash in accordance with the present invention.
Figure 2:
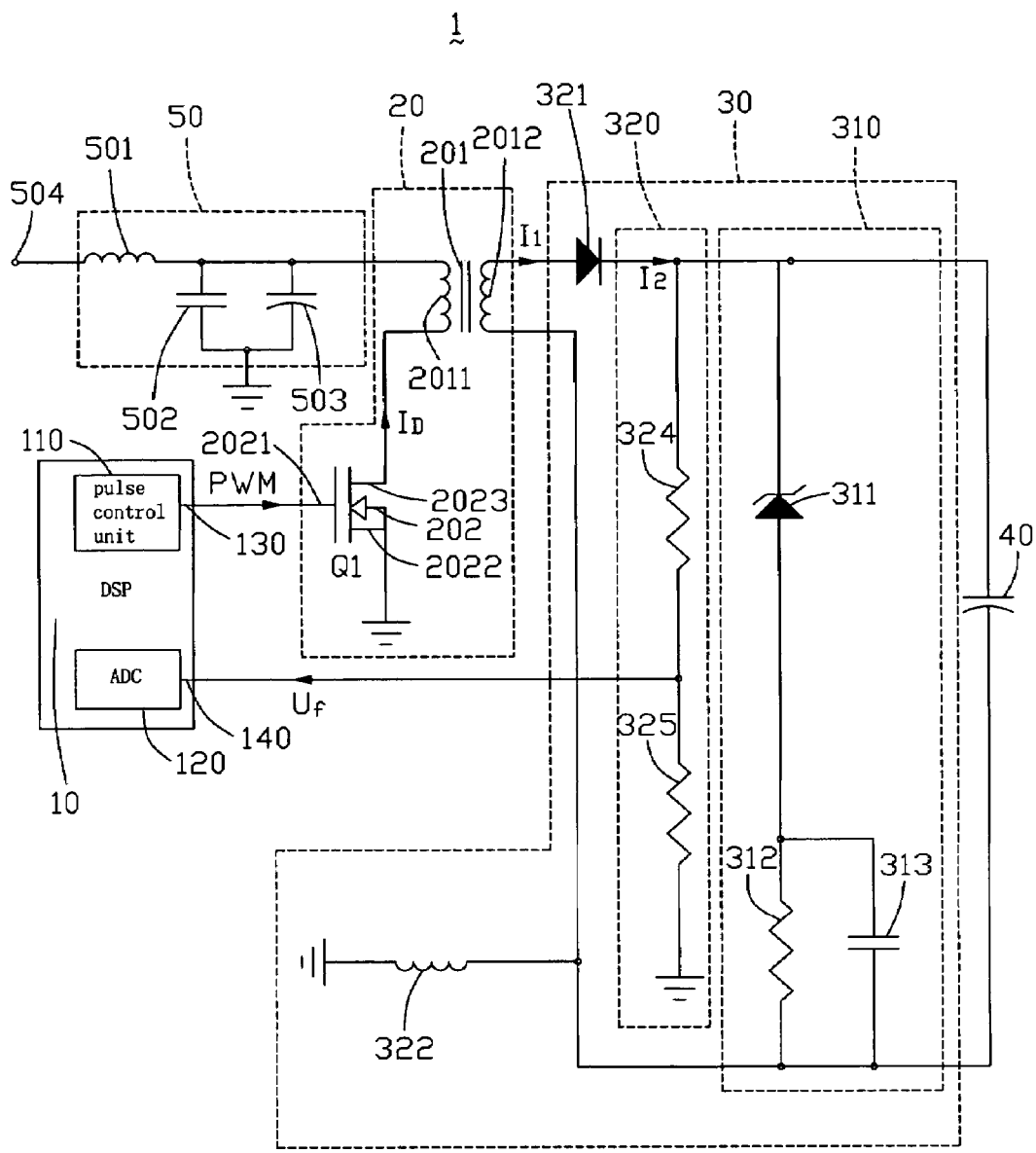
FIG. 2 is a circuit diagram of the charging device for a camera flash in accordance with a first embodiment of the present invention.

Referring to FIGS. 1 to 2, a charging device 1 for a camera flash in accordance with a first embodiment of the present invention comprises a digital signal processor (DSP) 10, a voltage boosting circuit 20 electrically connected with the DSP 10, a charging circuit 30 electrically connected with the voltage boosting circuit 20 and the DSP 10, a flash capacitor 40 electrically connected with the charging circuit 30, and a filtering circuit 50 electrically connected with the voltage boosting circuit 20.

The DSP 10 is the central chip for a camera, such as Zoran's Coach 6 and Coach 7. The DSP 10 comprises a number of processing units for processing different signals and implementing different functions. These processing units include a pulse control unit 110 for providing a pulse width modulation (PWM) signal from a first terminal 130 thereof to the voltage boosting circuit 20, and an analog-to-digital converter (ADC) 120 for receiving a feedback signal $U_f$ (analog signal) from the charging circuit 30 to a second terminal 140 thereof and transforming the feedback signal $U_f$ into a digital signal.

The voltage boosting circuit 20 comprises a boosting transformer 201 and a metal oxide semiconductor field effect transistor (MOSFET) 202 with a channel of N-type. The boosting transformer 201 has a primary coil 2011 and a secondary coil 2012. The secondary coil 2012 has a coil number much less than that of the primary coil 2011. The MOSFET 202 has a source terminal 2021 electrically connected with the pulse control unit 110 of the digital signal processor 10, a drain terminal 2023 electrically connected with the primary coil 2011 of the boosting transformer 201, and a grounded gate terminal 2022. The charging circuit 30 comprises a current rectifying diode 321 connected to the secondary coil 2012 of the boosting transformer 201, a protection circuit 310 connected with the flash capacitor 40 for protecting the flash capacitor 40, a feedback circuit 320 for feeding back the feedback signal $U_f$ to the ADC 120, and a grounded inductor 322 for filtering redundant signals. The feedback circuit 320 comprises a pair of serially connected first and second resistors 324 and 325. The protection circuit 310 comprises a Zener diode 311, a third resistor 312 and a capacitor 313.

The filtering circuit 50 is consisted of an inductor 501 connected to a battery 504 and a pair of parallelly connected capacitors 502 and 503. The capacitors 502 and 503 are both grounded. The filtering circuit 50 is used for oscillating at a special frequency, preferably same as the frequency of an oscillation current (described in detail hereinafter) produced by the primary coil 2011 of the boosting transformer 201, thus preventing the primary current from influencing the battery 504.

The pulse control unit 110 of the DSP 10 outputs the PWM signal with a certain width to drive the MOSFET 202 and more exactly to control a gate-to-source voltage VGS of the MOSFET 202. The PWM signal is a voltage or a current source by repeating series of on and off pulses. When the PWM signal is "on" (i.e. a state with an output), the gate-to-source voltage $V_{GS}$ of the MOSFET 202 is positive and results in an increase of a drain current ID passing through the MOSFET 202. When the PWM signal is "off" (i.e. a state with no output), the gate-to-source voltage VGS of the MOS-FET 202 is zero and results in a decrease of the drain current ID. The repeating increase and decrease of the drain current ID caused by the on-off circle of the PWM signal generate the oscillation current (not shown) in the primary coil 2011 of the boosting transformer 201, thereby introducing an induced current $I_1$ to the secondary coil 2012 of the boosting transformer 201 which is then output to the charging circuit 30.

The current rectifying diode 321 is connected with the secondary coil 2012 of the boosting transformer 201 and the feedback circuit 320, and is adapted for converting the induced current $I_1$ (an alternating current) into a direct current $I_2$ for charging the flash capacitor 40. The voltage around the flash capacitor 40 is increased by means of the direct current $I_2$ until it reaches the inherent maximum value $V_a$ thereof. Once the voltage around the flash capacitor 40 exceeds the maximum value $V_a$, the Zener diode 311 of the protection circuit 310 is broken down to activate a protection current in the protection circuit 310 in a very short time, in order to make the flash capacitor 40 discharge, thereby protecting the flash capacitor 40.

The feedback signal $U_f$ is elicited from between the first and the second resistors 324 and 325, and feedback to the ADC 120 of the DSP 10. When the voltage around the flash capacitor 40 reaches the maximum value $V_a$, the feedback signal $U_f$ reaches a critical voltage at the same time. The critical voltage is predetermined in the DSP 10 according to the maximum value $V_a$ of the flash capacitor 40 and the ratio of the value of the first resistor 324 to the value of the second resistor 325. For example, suppose the maximum value $V_a$ is 300v, the ratio of value of the first to the second resistors 324 to 325 is 9:1, then the critical voltage can be calculated as 300*(1/(9+1))=30v. Therefore, whether the voltage around the flash capacitor 40 reaches the maximum value $V_a$ can be acquired by monitoring the feedback signal $U_f$ by the DSP 10. If the voltage of the feedback signal $U_f$ is more than or equal to the critical voltage (i.e., the voltage around the flash capacitor 40 reaches or exceeds the maximum value $V_a$), the pulse control unit 110 of the DSP 10 stops to send the PWM signal. Contrarily, if the voltage of the feedback signal $U_f$ is less than the critical voltage (i.e., the voltage around the flash capacitor 40 doesn't reach the maximum value $V_a$), the pulse control unit 110 of the DSP 10 sends the PWM signal once again in order to activate the voltage boosting circuit 20 and the charging circuit 30 to charge the flash capacitor 40 again.

Figure 3:
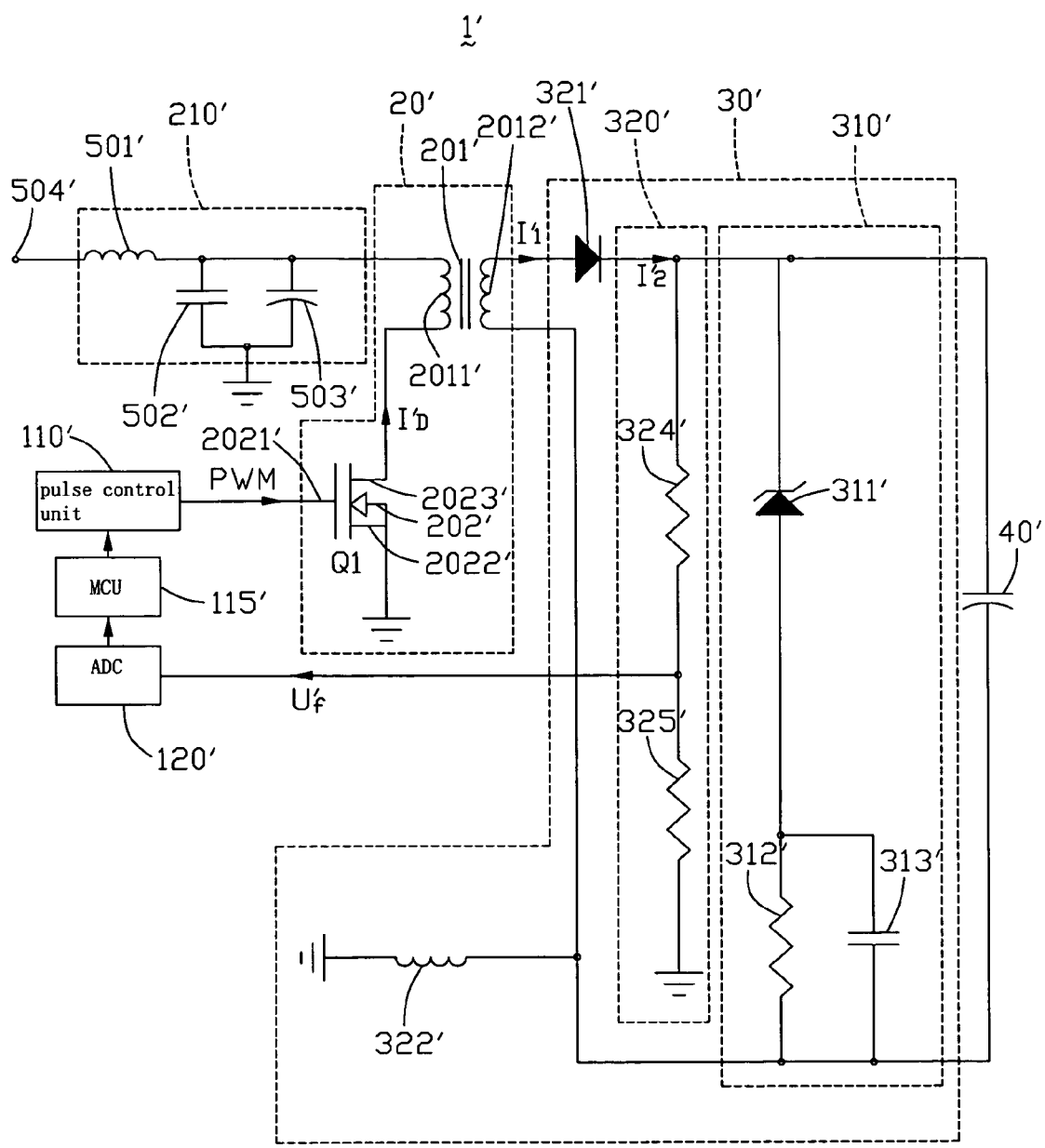
FIG. 3 is a circuit diagram of the charging device for a camera flash in accordance with a second embodiment of the present invention.

Referring to FIG. 3, a charging device 1' for a camera flash in accordance with a second embodiment of the present invention is illustrated. The charging device 1' has a structure similar to the charging device 1 in accordance with the first embodiment of the present invention, except that it comprises a general micro processing unit (MPU) 115' which is combined with a pulse control unit 110' and an analog-to-digital converter (ADC) 120' as a unit to replace the DSP 10. The pulse control unit 110' is connected with the MOSFET 202' and is adapted to output a PWM signal to the voltage boosting circuit 20'. The ADC 120' is adapted for receiving an analog feedback signal $U_f'$ from the feedback circuit 320' and then sending a digital signal converted from the analog feedback signal $U_f'$ to the MPU 115'. The MPU 115' is adapted for controlling the pulse control unit 110' to determine whether or not to output the PWM signal in terms of the digital signal after converting provided by the ADC 120'. The working of the voltage boosting circuit 20', the charging circuit 30', and the filtering circuit 50' is the same as that disclosed in the first embodiment of the present invention. If the voltage of the feedback signal $U_f'$ is more than or equal to the predetermined critical voltage (i.e., the voltage around the flash capacitor 40' reaches or exceeds the maximum value $V_a$ thereof), the pulse control unit 110' stops to output the PWM signal. Contrarily, if the voltage of the feedback signal $U'_f$ is less than the predetermined critical voltage (i.e., the voltage around the flash capacitor 40' doesn't reach the maximum value $V_a$ thereof), the pulse control unit 110' outputs the PWM signal once again in order to activate the voltage boosting circuit 20' and the charging circuit 30' to charge the flash capacitor 40' again.

It is to be understood, however, that even though numerous characteristics and advantages of the present invention have been set forth in the foregoing description, together with details of the structure and function of the invention, the disclosure is illustrative only, and changes may be made in detail, especially in matters of material, plating method and manufacturing process within the principles of the invention to the full extent indicated by the broad general meaning of the terms in which the appended claims are expressed.

What is claimed is:

1. A charging device for a camera flash, comprising:
    a digital signal processor for providing a pulse width modulation signal and receiving a feedback signal;
    a voltage boosting circuit electrically connected with the digital signal processor for outputting an induced current under the control of the pulse width modulation signal;
    a flash capacitor; and
    a charging circuit electrically connected with the voltage boosting circuit and the flash capacitor, the charging circuit charging the flash capacitor by means of the induced current, and comprising a protection circuit parallelly connected with the flash capacitor, and a feedback circuit outputting the feedback signal to the digital signal processor.

2. The charging device for a camera flash as claimed in claim 1, wherein, once the feedback signal reaches a predetermined critical voltage, the digital signal processor stops to provide the pulse width modulation signal.

3. The charging device for a camera flash as claimed in claim 2, wherein the digital signal processor comprises an analog-to-digital converter for receiving the feedback signal and converting the feedback signal from an analog signal to a digital signal.

4. The charging device for a camera flash as claimed in claim 3, wherein the digital signal processor comprises a pulse control unit for outputting the pulse width modulation signal in terms of the feedback signal.

5. The charging device for a camera flash as claimed in claim 4, wherein the feedback circuit comprises a pair of serially connected first and second resistors, and the feedback signal is output from between the first and second resistors.

6. The charging device for a camera flash as claimed in claim 5, wherein the critical voltage is predetermined in the digital signal processor in accordance with an inherent maximum value of the flash capacitor and a ratio of the value of the first resistor to that of the second resistor.

7. The charging device for a camera flash as claimed in claim 4, wherein the charging circuit comprises a current rectifying diode electrically connected with the flash capacitor for converting the induced current from an alternating current into a direct current.

8. The charging device for a camera flash as claimed in claim 4, wherein the protection circuit at least comprises a Zener diode.

9. The charging device for a camera flash as claimed in claim 1, wherein the voltage boosting circuit comprises a field effect transistor electrically connected with the digital signal processor and a transformer electrically connected with the field effect transistor and the charging circuit.

10. The charging device for a camera flash as claimed in claim 9, wherein the field effect transistor is a metal oxide semiconductor field effect transistor with a channel of N-type, and the transformer is a boosting transformer.

11. The charging device for a camera flash as claimed in claim 9, further comprising a filtering circuit with one end thereof electrically connected with the voltage boosting circuit and the other end thereof electrically connected with a battery, the filtering circuit being adapted for preventing an oscillation current in the transformer from influencing the battery.

12. A charging device for a camera flash comprising:
    a flash capacitor;
    a pulse control unit for outputting a pulse width modulation signal;
    an analog-to-digital converter for receiving a feedback signal and converting the feedback signal from an analog signal into a digital signal;
    a micro processing unit electrically connected with the pulse control unit and the analog-to-digital converter, the micro processing unit controlling the output of the pulse width modulation signal in accordance with the feedback signal;
    a voltage boosting circuit electrically connected with the pulse control unit and outputting an induced current under the control of the pulse control unit; and
    a charging circuit with one port electrically connected with the voltage boosting circuit for receiving the induced current and another port electrically connected with the flash capacitor, the charging circuit comprising a protection circuit parallelly connected with the flash capacitor, and outputting said feedback signal to the analog-to-digital converter.

13. The charging device for a camera flash as claimed in claim 12, wherein, once the feedback signal reaches a predetermined critical voltage, the digital signal processor stops to outputting the pulse width modulation signal.

14. The charging device for a camera flash as claimed in claim 13, wherein the charging circuit comprises a feedback circuit for providing the feedback signal from between a pair of serially connected first and second resistors, and the critical voltage is predetermined in the micro processing unit according to a maximum value of the flash capacitor and a ratio of the value of the first resistor to that of the second resistor.

15. The charging device for a camera flash as claimed in claim 13, wherein the protection circuit comprises at least a Zener diode.

16. The charging device for a camera flash as claimed in claim 13, wherein the voltage boosting circuit comprises a metal oxide semiconductor field effect transistor electrically connected with the pulse control unit and a boosting transformer electrically connected with the metal oxide semiconductor field effect transistor and the charging circuit.

* * * * *